United States Patent
Iwanaga et al.

(10) Patent No.: US 6,713,035 B1
(45) Date of Patent: Mar. 30, 2004

(54) PROCESS FOR PRODUCING CHLORINE

(75) Inventors: Kiyoshi Iwanaga, Chiba (JP); Masayuki Yoshii, Ichihara (JP); Tetsuya Suzuta, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/889,736

(22) PCT Filed: Jan. 19, 2000

(86) PCT No.: PCT/JP00/00211

§ 371 (c)(1),
(2), (4) Date: Jul. 20, 2001

(87) PCT Pub. No.: WO01/60743

PCT Pub. Date: Aug. 23, 2001

(51) Int. Cl.$^7$ .................................................. C01B 7/04
(52) U.S. Cl. ...................................... 423/502; 423/507
(58) Field of Search ................................. 423/502, 507

(56) References Cited

U.S. PATENT DOCUMENTS

| | | | | |
|---|---|---|---|---|
| 3,760,067 A | * | 9/1973 | Ingwalson | 423/502 |
| 4,774,070 A | * | 9/1988 | Itoh et al. | 423/502 |
| 4,822,589 A | * | 4/1989 | Kiyoura et al. | 423/502 |
| 5,639,436 A | | 6/1997 | Benson et al. | 423/502 |
| 5,707,919 A | * | 1/1998 | Miyata et al. | 502/319 |
| 5,871,707 A | * | 2/1999 | Hibi et al. | 423/502 |
| 5,908,607 A | | 6/1999 | Abekawa et al. | 423/502 |

FOREIGN PATENT DOCUMENTS

| | | |
|---|---|---|
| EP | 0 761 593 A1 | 3/1997 |
| EP | 0 861 803 A1 | 9/1998 |
| EP | 0 963 184 A2 | 8/1999 |
| HU | P0105211 A | 4/2002 |
| JP | 09-118503 | 5/1997 |
| WO | WO 0160743 A1 | 8/2001 |

* cited by examiner

*Primary Examiner*—Ngoc-Yen Nguyen
(74) *Attorney, Agent, or Firm*—Sughrue Mion, PLLC

(57) ABSTRACT

A process for producing chlorine comprising the step of oxidizing hydrogen chloride in a gas containing hydrogen chloride with a gas containing oxygen in a fixed bed reaction system having a reaction zone comprising a catalyst-packed layer, wherein a superficial linear velocity of the gas in a column is from 0.70 to 10 m/sec. According to this process, the stable activity of the catalyst is maintained and chlorine can be stably obtained at a high yield since the excessive hot spot in the catalyst-packed layer is suppressed and the catalyst-packed layer can be effectively used.

13 Claims, No Drawings

PROCESS FOR PRODUCING CHLORINE

FIELD OF THE INVENTION

The present invention relates to a process for producing chlorine. In particular, the present invention relates to a process for producing chlorine comprising oxidizing hydrogen chloride in a gas containing hydrogen chloride with a gas containing oxygen.

BACKGROUND ART

Chorine is a useful raw material for the production of vinyl chloride, phosgene, etc. and it is well known that chlorine is obtained through the oxidization of hydrogen chloride. For example, a process comprising catalytically oxidizing hydrogen chloride with molecular oxygen in the presence of a catalyst to obtain chlorine is known. With this process, a copper base catalyst, which is called a Deacon catalyst, is known to have a good catalytic activity, and various Deacon catalysts comprising copper chloride, potassium chloride and various kinds of compounds as third components are proposed. Besides the Deacon catalysts, processes using chromium oxide or its compound, or a ruthenium oxide or its compound, as a catalyst are also proposed.

However, since the oxidation reaction of hydrogen chloride is an exothermic reaction with 59 kJ/mol-chlorine, it is important to suppress excessive hot spot in a layer packed with the catalyst from the viewpoint of reducing the thermal degradation of the catalyst and maintaining the stability and easiness of operation. Furthermore, the excessive hot spot may induce a runaway reaction in the worst case, or the high temperature gas corrosion of a reactor material may be caused with hydrogen chloride and/or chlorine. "Catalyst" Vol. 33, No. 1 (1991) describes that, in the reaction of pure hydrogen chloride with pure oxygen in the presence of chromium oxide as a catalyst, it is difficult to remove the hot spot in a fixed bed reaction system, and that it is necessary to use a fluidized bed reactor in a practical apparatus.

DISCLOSURE OF INVENTION

Under such circumstances, one object of the present invention is to provide a process for producing chlorine comprising oxidizing hydrogen chloride in a gas containing hydrogen chloride with a gas containing oxygen in a fixed bed reaction system having a reaction zone comprising a catalyst-packed layer, in which the stable activity of the catalyst is maintained by suppressing the excessive hot spot in the catalyst-packed layer and making effective use of the catalyst-packed layer, and which is very advantageous from the viewpoint of a catalyst cost, an equipment cost, an operation cost, and the stability and easiness of the operation.

According to the present invention, this object can be achieved by a process for producing chlorine comprising the step of oxidizing hydrogen chloride in a gas containing hydrogen chloride with a gas containing oxygen in a fixed bed reaction system having a reaction zone comprising a catalyst-packed layer, wherein a superficial linear velocity of the gas in a column is from 0.70 to 10 m/sec.

EMBODIMENTS FOR CARRYING OUT THE INVENTION

As a gas containing hydrogen chloride to be used in the present invention, any gas containing hydrogen chloride, that is generated through a pyrolysis or combustion reaction of chlorine-containing compounds, a phosgeniting dehydrogen chlorination or chlorination reaction of organic compounds, combustion in an incinerator, etc., may be used.

The concentration of hydrogen chloride in the gas containing hydrogen chloride is usually at least 10% by volume, preferably at least 50% by volume, more preferably at least 80% by volume. When the concentration of hydrogen chloride is less than 10% by volume, the separation of chlorine formed, and/or the recycling in the case of recycling unreacted oxygen may become complicated.

Components other than hydrogen chloride, which are contained in the gas containing hydrogen chloride, include aromatic chlorohydrocarbons (e.g. o-dichlorobenzene, monochlorobenzene, etc.), aromatic hydrocarbons (e.g. toluene, benzene, etc.), aliphatic chlorohydrocarbons (e.g. vinyl chloride, 1,2-dichloroethane, methyl chloride, ethyl chloride, propyl chloride, allyl chloride, etc.), aliphatic hydrocarbons (e.g. methane, acetylene, ethylene, propylene, etc.), and inorganic gasses (e.g. nitrogen, argon, carbon dioxide, carbon monoxide, phosgene, hydrogen, carbonyl sulfide, hydrogen sulfide, etc.).

In the course of the reaction of hydrogen chloride and oxygen, the aromatic chlorohydrocarbons and the aliphatic chlorohydrocarbons are oxidized to generate carbon dioxide, water and chlorine, the aromatic hydrocarbons and the aliphatic hydrocarbons are oxidized to generate carbon dioxide and water, carbon monoxide is oxidized to generate carbon dioxide, and phosgene is oxidized to generate carbon dioxide and chlorine.

As the gas containing oxygen, oxygen or an air is used. Oxygen may be produced by usual industrial methods such as a pressure-swing method of an air, deep-cooling separation of an air, etc.

While the theoretical molar amount of oxygen necessary for oxidizing one mole of hydrogen chloride is 0.25 mole, it is preferable to use oxygen in an amount exceeding the theoretical amount, and more preferably, 0.25 to 2 moles of oxygen is used per one mole of hydrogen chloride. When the amount of oxygen is too low, the conversion of hydrogen chloride may decrease. When the amount of oxygen is too high, it may be difficult to separate formed chlorine from unreacted oxygen.

In the present invention, preferably, the catalyst-packed layer is divided into at least two reaction zones, and the gas containing oxygen is divided into at least two portions and introduced in the respective reaction zones.

One example of a method for introducing the gas containing oxygen with dividing it into portions is a method comprising introducing the whole volume of the gas containing hydrogen chloride and a part of the gas containing oxygen in the first reaction zone, and introducing the reaction mixture from the first reaction zone and the rest of the gas containing oxygen in the second reaction zone. Herein, the first reaction zone means a reaction zone in which the raw material gas is firstly introduced, while the second reaction zone means a reaction zone in which the raw material gas is introduced subsequent to the first reaction zone. The divided amount of the gas containing oxygen, which is introduced in the first reaction zone, is from 5 to 90%, preferably from 10 to 80%, more preferably from 30 to 60% based on the whole volume of the gas containing oxygen. When this divided amount is too low, it may be difficult to control the temperature in the second and subsequent reaction zones.

The catalyst used in the oxidation reaction according to the present invention may be any known catalyst that is used in the production of chlorine through the oxidation of hydrogen chloride. Examples of such a catalyst include catalysts comprising copper chloride, potassium chloride and various compounds as third components, catalysts comprising chromium oxide, catalysts comprising ruthenium oxide, etc. Among them, the catalysts comprising ruthenium oxide are preferable, and those comprising ruthenium oxide and titanium oxide are more preferable. The catalysts comprising ruthenium oxide are disclosed in JP-A-10-182104 and EP 936 184, and the catalyst comprising ruthenium oxide and titanium oxide are disclosed in JP-A-10-194705 and JP-A-10-338502. The amount of ruthenium oxide in the catalyst is preferably from 0.1 to 20% by weight. When the amount of ruthenium oxide is too low, the catalytic activity may be low and thus the conversion of hydrogen chloride may decrease. When the amount of ruthenium oxide is too high, the catalyst may become too expensive.

The shape of the catalyst may be any of conventionally used shapes such as a spherical particle, a cylindrical pellet, an extruded form, a ring form, a honeycomb form, or a granule having a suitable size which is produced by milling of a molded material and sieving thereof. The size of the catalyst is preferably 10 mm or less. When the size of the catalyst exceeds 10 mm, the catalytic activity may deteriorate. Although the lower limit of the size of the catalyst may not be limited, the size of the catalyst is at least 0.1 mm, since a pressure loss in the catalyst-packed layer increases if the size is too small. Herein, the size of the catalyst means a diameter of a sphere in the case of the spherical particle, a diameter of a cross section in the case of the cylindrical pellet, or the largest size of the cross section in the case of other forms.

In general, the amount (volume) of the catalyst used is selected so that a ratio of the volume to the supply rate of hydrogen chloride under the normal state (GHSV) is from 10 to 20,000 h$^{-1}$.

The direction of flowing the raw materials in the reaction zone is not limited, and the upward or downward stream may be employed.

A reaction pressure is usually from 0.1 to 5 MPa. A reaction temperature is preferably from 200 to 500° C., more preferably from 200 to 380° C. When the reaction temperature is too low, the conversion of hydrogen chloride may decrease. When the reaction temperature is too high, the catalyst component may volatilize.

The reaction zone comprising the catalyst-packed layer means a zone which is packed with substantially the catalyst only, the mixture of substantially the catalyst and an inactive material for diluting the catalyst, the mixture of substantially the catalyst and a carrier, or the mixture of substantially the catalyst, an inactive material for diluting the catalyst and a carrier. The inactive material may be packed in one or both of the upper and lower parts of the reaction zone comprising the catalyst-packed layer. However, a layer packed with only the inactive material is not regarded as a reaction zone.

In the process of the present invention, the superficial linear velocity of the gas in the column is from 0.70 to 10 m/sec., preferably from 0.70 to 6 m/sec., more preferably from 0.70 to 3 m/sec. Thereby, the excessive hot spot in the catalyst-packed layer is suppressed and the catalyst-packed layer is effectively used, so that the stable activity of the catalyst is maintained and chlorine can be stably obtained at a high yield. Accordingly, the catalyst cost, the equipment cost, the operation cost, and the stability and easiness of the operation are maintained at the reasonable levels. Herein, the superficial linear velocity of the gas in the column means a ratio of the total supply rate of all the gases supplied in the catalyst-packed layer under the normal state (0° C., 0.1 MPa) to the cross sectional area of the tubular reactor.

In the present invention, it is preferable to carry out the process in the fixed bed reaction system having the reaction zone comprising at least two catalyst-packed layers in the reactor, since the catalyst-packed layers are effectively used and thus chlorine is stably produced at a high yield. To form at least two catalyst-packed layers, the catalyst-packed layer in the tubular reactor is divided into at least two reaction zones along the axis direction of the reactor and catalysts having different activities, compositions and/or particle sizes are packed in at least two reaction zones respectively, or at least two portions of the catalyst are diluted with fillers consisting of the inactive material and/or the carrier at different dilution ratios and packed in at least two reaction zones respectively, or the catalyst and the catalyst which is diluted with fillers consisting of the inactive material and/or the carrier are packed in at least two reaction zones respectively. In general, two successive reaction zones are directly in contact with each other, but the inactive material may be packed between the reaction zones. However, the layer packed with only the inactive material is not regarded as a reaction zone.

As the number of the catalyst-packed layers divided increases, the catalyst-packed layers can be more effectively used. From the industrial viewpoint, the number of the reaction zones is usually from 2 to 20, preferably from 2 to 8, more preferably from 2 to 4. When the number of the reaction zones is too large, the kinds of the catalysts packed may increase so that the process may become less economical.

In the present invention, preferably, the catalyst-packed layer is divided into at least two reaction zones, and the ratio of the first reaction zone is 70% by volume or less, more preferably 30% by volume or less. More preferably, the reaction zones are packed with substantially the catalyst only, the mixture of substantially the catalyst and the inactive material, the mixture of substantially the catalyst and the carrier, or the mixture of substantially the catalyst, the inactive material and the carrier so that the ratio of the first reaction zone is 70% by volume or less, more preferably 30% by volume or less and the temperature in the second reaction zone is usually at least 5° C. higher, preferably at least 10° C. higher than that in the first reaction zone; or that the ratio of the first reaction zone is 70% by volume or less, more preferably 30% by volume or less and the activity in the second reaction zone is usually at least 1.1 times higher, preferably at least 1.5 times higher than that in the first reaction zone; or that the ratio of the first reaction zone is 70% by volume or less, more preferably 30% by volume or less, the temperature in the second reaction zone is usually at least 5° C. higher, preferably at least 10° C. higher than that in the first reaction zone and the activity in the second reaction zone is usually at least 1.1 times higher, preferably at least 1.5 times higher than that in the first reaction zone. Herein, the activity in the reaction zone (mol-HCl/ml-reaction zone.min) means a value obtained by dividing the product of the hydrogen chloride reaction activity per a unit catalyst weight and a unit time (mol-HCl/g-catalyst.min) and the amount of the catalyst filled (g-catalyst) by the volume of the reaction zone (ml-reaction zone). The hydrogen chloride reaction activity per a unit catalyst weight and a unit time is calculated from the amount of chlorine generated when hydrogen chloride and oxygen are reacted by supplying 0.5 mole of oxygen per 1 mole of hydrogen chloride at a ratio of a catalyst volume to a supply rate of hydrogen chloride under the normal state (0° C., 0.1 MPa) in the range between 4,400 and 4,800 h$^{-1}$, under a reaction pressure of 0.1 MPa at a reaction temperature of 280° C.

In the first reaction zone, the reaction rate is high since the concentrations of the reactants, that is, hydrogen chloride and oxygen are high. Therefore, in the case of, for example, a fixed bed reaction with a heat exchange system using a jacket, the hot spot is generated on the entrance side of the first reaction zone. On the other hand, the temperature at the exit of the first reaction zone is close to the temperature of a heating medium. When the ratio of the first reaction zone exceeds 70% by volume, a part having a temperature close to that of the heating medium in the jacket increases, and thus the catalyst cannot be effectively used.

In the present invention, the catalyst-packed layer is divided into at least two reaction zones along the axis direction of the reactor, and the reaction zones are preferably packed with substantially the catalyst only, the mixture of substantially the catalyst and the inactive material, the mixture of substantially the catalyst and the carrier, or the mixture of substantially the catalyst, the inactive material and the carrier so that the thermal conductivity becomes highest in the first reaction zone, more preferably, so that the thermal conductivity in the reaction zones successively decreases from the first reaction zone to the last reaction zone along the direction of the gas flow.

Here, the last reaction zone means a reaction zone into which the raw material gas is lastly supplied. The thermal conductivity of the reaction zone means that of the materials packed in the reaction zone.

In the reaction zone on the entrance side of the raw materials, the reaction rate is high and the amount of heat generated by the oxidation reaction is large, since the concentrations of hydrogen chloride and oxygen are high. Accordingly, the excessive hot spot can be suppressed when the catalyst having the relatively high thermal conductivity is filled in the reaction zone(s) on the entrance side.

In the present invention, the catalyst-packed layer is divided into at least two reaction zones along the axis direction of the reactor, and the reaction zones are preferably packed with substantially the catalyst only, the mixture of substantially the catalyst and the inactive material, the mixture of substantially the catalyst and the carrier, or the mixture of substantially the catalyst, the inactive material and the carrier so that the activities of the reaction zones successively increase from the first reaction zone to the last reaction zone along the direction of the gas flow. Thereby, the temperature difference between the adjacent reaction zones decreases and thus the operation can be easily maintained stable.

In the present invention, the catalyst-packed layer is divided into at least two reaction zones along the axis direction of the reactor, and the reaction zones are preferably packed with substantially the catalyst only, the mixture of substantially the catalyst and the inactive material, the mixture of substantially the catalyst and the carrier, or the mixture of substantially the catalyst, the inactive material and the carrier so that the activity of the last reaction zone is higher than that of the reaction zone immediately preceding the last reaction zone and the hot spot in the last reaction zone is made lower than that in the reaction zone immediately preceding the last reaction zone. When the activity of the last reaction zone is lower than that of the reaction zone immediately preceding the last reaction zone, and the hot spot in the last reaction zone is higher than that in the reaction zone immediately preceding the last reaction zone, the conversion of hydrogen chloride may decrease due to the chemical equilibrium composition, since the reaction to convert hydrogen chloride to chlorine and water through the oxidization of hydrogen chloride with oxygen is an equilibrium reaction.

In the present invention, the catalyst-packed layer is divided into at least two reaction zones along the axis direction of the reactor, and the gas temperature at the exit of the last reaction zone is preferably in the range between 200 and 350° C., more preferably in the range between 200 and 320° C. When the gas temperature at the exit of the last reaction zone exceeds 350° C., the conversion of hydrogen chloride may decrease due to the chemical equilibrium composition, since the reaction to convert hydrogen chloride to chlorine and water through the oxidization of hydrogen chloride with oxygen is an equilibrium reaction.

In the present invention, the temperature of the reaction zones comprising the catalyst-packed layer is preferably controlled with a heat exchange system, since the heat of reaction is satisfactorily removed and the stability and easiness of the operation are maintained. Herein, the heat exchange system means a system providing a jacket outside the tubular reactor, which is filled with the catalyst to remove the heat of reaction generated by the reaction with a heating medium in the jacket. With the heat exchange system, the temperature in the reaction zone comprising the catalyst-packed layer in the reactor can be controlled with the heating medium in the jacket. In the industrial process, a shell-and-tube heat exchanger type fixed bed multi-tube reactor may be used, in which tubular reactors, which are arranged in series and have the reaction zones comprising the catalyst-packed layer, are arranged in parallel, and a jacket is provided around the tubular reactors. Besides the heat exchange system, an electric furnace system may be used, but it has a problem such that the temperature control in the reaction zone(s) is difficult.

Examples of the heating medium include molten salts, steam, organic compounds, molten metals, etc. Among them, the molten salt or steam is preferable from the viewpoint of the thermal stability and handling easiness, and the molten salt is more preferable from the viewpoint of the good thermal stability. The molten metal is expensive and difficult to handle. Examples of the composition of the molten salt include the mixture of 50% by weight of potassium nitrate and 50% by weight of sodium nitrite, the mixture of 53% by weight of potassium nitrate, 40% by weight of sodium nitrite and 7% by weight of sodium nitrate, etc. Examples of the organic compound include DOWTHERM A (the mixture of diphenyloxide and diphenyl), etc.

In the present invention, preferably the temperature of the reaction zones comprising the catalyst-packed layer is controlled with at least two independent temperature control systems, since the catalyst-packed layer is effectively used so that chlorine can be obtained at a high yield. To this end, the following methods may be used:

The catalyst-packed layer is divided into at least two reaction zones along the axis direction of the reactor and the temperatures of the reaction zones are controlled with heat exchange system and a temperature-controlling system other than the heat exchange system; discrete jackets are provided on at least two reaction zones and the heating media are independently circulated in the discrete jackets to control the temperatures of the reaction zones; or a jacket is divided into at least two sections with partitions and the heating media are independently circulated in the partitioned sections to control the temperatures of the reaction zones; or the combination of these methods. The partitions may be directly fixed to the tubular reactors by welding, although a gap may be left between each partition and the tubular reactor to an extent that the heating media can be substantially independently circulated. The heating medium in the jacket is preferably flowed from the bottom to the top of the jacket so that the medium has no cavitation therein. As the number of the reaction zones the temperatures of which are independently controlled increases, the reaction zones are more effectively used. In the commercial operation, the number of the reaction zones is usually from 2 to 20, preferably from 2 to 8, more preferably from 2 to 4. When the number of the reaction zones to be temperature controlled, the number of apparatuses used for controlling the temperature increases, which may be disadvantageous from the economical viewpoint.

In the present invention, the catalyst-packed layer is divided into at least two reaction zones along the axis direction of the reactor and the temperature control of all the reaction zones is preferably carried out with the heat exchange system, since the heat of reaction is satisfactorily removed and the stability and easiness of the operation are maintained.

The inner diameter of the tubular reactor is usually from 10 to 50 mm, preferably from 10 to 40 mm, more preferably from 10 to 30 mm. When the inner diameter of the tubular reactor is too small, the excessive number of the tubular reactors may be required to achieve the satisfactory throughput of hydrogen chloride with an industrial scale reaction apparatus. When the inner diameter of the tubular reactor is too large, the excessive hot spot may be formed in the catalyst-packed layer.

The ratio of the inner diameter (D) of the tubular reactor to the size (d) of the catalyst (D/d) is usually from 5/1 to 100/1, preferably from 5/1 to 50/1, more preferably from 5/1 to 20/1. When the ratio D/d is too small, the excessive hot spot may be formed in the catalyst-packed layer, or the excessive number of the tubular reactors may be required to achieve the satisfactory throughput of hydrogen chloride with an industrial scale reaction apparatus. When this ratio is too large, the excessive hot spot may be formed in the catalyst-packed layer, or the pressure loss in the catalyst-packed layer may increase.

EXAMPLES

The present invention will be illustrated by the following Examples.

Example 1

As a reactor, a fixed bed reactor was used, which consisted of a nickel tubular reactor (with a sheath tube for temperature measurement having an outer diameter of 5 mm) having an inner diameter of 18 mm and a length of 1 m and was equipped with a jacket using a molten salt (potassium nitrate/sodium nitrite=1/1 by weight) as a heating medium. In the tubular reactor, 99.4 g (100 ml) of a spherical catalyst comprising 6.6 wt. % of ruthenium oxide supported on anatase crystal $TiO_2$ having a diameter of 1 to 2 mm was packed to form a catalyst-packed layer. In the upper and lower parts of the catalyst-packed layer, 238 g and 164 g of $\alpha$-$Al_2O_3$ spheres having a diameter of 2 mm (SSA 995 manufactured by NIKKATO Co., Ltd.) were filled, respectively. The above catalyst was produced according to the method described in JP-A-10-338502, and reused after it had been used for 890 hours.

Hydrogen chloride (hydrogen chloride: 99% volume or more) and oxygen (oxygen: 99% by volume) were supplied at a flow rate of 9.4 l/min. (normal state) and 4.7 l/min. (normal state) respectively and heated in a preheating tube of nickel having an inner diameter of 30 mm (with a sheath tube for temperature measurement with an outer diameter of 6 mm), which was heated at 380° C. with an electric furnace, while water was supplied at a rate of 0.756 g/min. in a preheating tube of stainless steel having an inner diameter of 2 mm to generate steam. Then, the preheated mixture of hydrogen chloride and oxygen and the steam were mixed, and flowed downwardly from the top to the bottom of the tubular reactor. The molar ratio of hydrogen chloride:oxygen:water was 10:5:1, and GHSV was 5,639 $h^{-1}$, and the superficial linear velocity of the gas was 1.1 m/sec.

The temperature of the molten salt in the jacket was 336° C., the reaction temperature in the catalyst layer was 337° C. at the entrance, 356° C. at the exit, and 368° C. at the hot spot. In this case, the pressure at the entrance of the tubular reactor was 0.12 MPa-G. The exit gas was collected in an aqueous solution of potassium iodide so that generated chlorine, unreacted hydrogen chloride and generated water were absorbed in the solution. Then, the amount of chlorine generated and the amount of unreacted hydrogen chloride were measured with the iodometry and the neutralization titration, respectively. The conversion of hydrogen chloride to chloride was 21.5%.

Comparative Example 1

The reaction was carried out in the same manner as in Example 1 except that the amount of the catalyst was changed to 48.1 g (49 ml), and hydrogen chloride, oxygen and water were supplied at rates of 4.7 l/min., 2.4 l/min. and 0.378 g/min., respectively. The molar ratio of hydrogen chloride:oxygen:water was 10:5:1, GHSV was 5,761 $h^{-1}$, and the superficial linear velocity of the gas was 0.54 m/sec.

The temperature of the molten salt was 336° C., but the temperature of the hot spot in the catalyst layer exceeded 380° C. and thus could not be controlled.

Comparative Example 2

The reaction was carried out in the same manner as in Example 1 except that the amount of the catalyst was changed to 18.8 g (20 ml), and hydrogen chloride, oxygen and water were supplied at rates of 1.9 l/min., 0.9 l/min. and 0.151 g/min., respectively. The molar ratio of hydrogen chloride:oxygen:water was 10:5:1, GHSV was 5,724 $h^{-1}$, and the superficial linear velocity of the gas was 0.22 m/sec.

The temperature of the molten salt was 336° C., but the temperature of the hot spot in the catalyst layer exceeded 380° C. and thus could not be controlled.

Effects of the Invention

As explained in the above, according to the present invention, the excessive hot spot in the catalyst-packed layer is suppressed and thus the catalyst-packed layer can be effectively used in the process for producing chlorine comprising oxidizing hydrogen chloride in a gas containing hydrogen chloride with a gas containing oxygen. Therefore, the activity of the catalyst is maintained stable, and chlorine can be stably obtained at a high yield. Accordingly, the process of the present invention is an advantageous process for producing chlorine from the viewpoint of a catalyst cost, an equipment cost, an operation cost, and the stability and easiness of the operation.

What is claimed is:

1. A process for producing chlorine comprising the step of oxidizing hydrogen chloride in a gas containing hydrogen chloride with a gas containing oxygen in a fixed bed reaction system having a reaction zone comprising a catalyst-packed layer, wherein a superficial linear velocity of all the gases supplied in the catalyst-packed layer is from 0.70 to 10 m/sec.

2. The process according to claim 1, wherein the oxidation is carried out with a fixed bed reaction system comprising at least two reaction zones comprising a catalyst-packed layer.

3. The process according to claim 2, wherein the ratio of the first reaction zone, in which the raw materials are firstly supplied, is 70% by volume or less based on the whole volume of said at least two reaction zones.

4. The process according to claim 3, where in a temperature in the second reaction zone, to which the raw materials are supplied next to the first reaction zone, is at least 5° C. higher than that in the first reaction zone.

5. The process according to claim 3, an activity in the second reaction zone is at least 1.1 times higher than that in the first reaction zone.

6. The process according to claim 2, wherein the reaction zones are packed with substantially the catalyst only, a mixture of substantially the catalyst and an inactive material, a mixture of substantially the catalyst and a carrier, or a mixture of substantially the catalyst, the inactive material and the carrier so that the thermal conductivity becomes highest in the first reaction zone.

7. The process according to claim 2, wherein the reaction zones are packed with substantially the catalyst only, a mixture of substantially the catalyst and an inactive material, a mixture of substantially the catalyst and a carrier, or a mixture of substantially the catalyst, the inactive material and the carrier so that the thermal conductivity in the reaction zones successively decreases from the first reaction zone to the last reaction zone to which the raw materials are lastly supplied, along the direction of the gas flow.

8. The process according to claim 2, wherein the reaction zones are packed with substantially the catalyst only, a mixture of substantially the catalyst and an inactive material, a mixture of substantially the catalyst and a carrier, or a mixture of substantially the catalyst, the inactive material and the carrier so that the activities of the reaction zones successively increase from the first reaction zone to the last reaction zone along the direction of the gas flow.

9. The process according to claim 2, wherein the reaction zones are packed with substantially the catalyst only, a mixture of substantially the catalyst and an inactive material, a mixture of substantially the catalyst and a carrier, or a mixture of substantially the catalyst, the inactive material and the carrier so that the activity of the last reaction zone is higher than that of the reaction zone immediately preceding the last reaction zone, and the hot spot in the last reaction zone is made lower than that in the reaction zone immediately preceding the last reaction zone.

10. The process according to claim 2, wherein a gas temperature at the exit of the last reaction zone is in the range between 200 and 350° C.

11. The process according to claim 1, wherein the temperature of the reaction zones comprising the catalyst-packed layer is controlled with a heat exchange system.

12. The process according to claim 1, wherein the temperature of the reaction zones comprising the catalyst-packed layer is controlled with at least two independent temperature control systems.

13. The process according to claim 2, wherein the volume of the gas containing oxygen is divided and supplied in the reaction zones.

* * * * *